Patented Nov. 7, 1922.

1,434,909

UNITED STATES PATENT OFFICE.

HAROLD A. MORTON, OF AKRON, OHIO.

RUBBER VULCANIZATION AND PRODUCT THEREOF.

No Drawing.  Application filed May 5, 1921.  Serial No. 467,000.

*To all whom it may concern:*

Be it known that I, HAROLD A. MORTON, a citizen of the United States, and a resident of Akron, in the county of Summit and State of Ohio, have invented certain new and useful Improvements in Rubber Vulcanization and Products Thereof, of which the following is a specification.

This invention has for its object the increase in the rapidity of the vulcanization process and the production of a rubber compound possessing valuable qualities, and the invention includes the novel process and article or product hereinafter described and defined by the appended claims.

According to the invention there is added to the rubber compound, prior to vulcanization with sulphur, a small quantity of tertiary amyl amine or any of its derivatives.

By the addition of this substance or any of its derivatives to a rubber mixture in an appropriate quantity, and then elevating the temperature, as is practised in the art, a well vulcanized product is obtained in a very short time. Moreover there are additional advantages, namely, that the resulting rubber compound possesses high tensile strength and remarkable durability.

Some of the derivatives of tertiary amyl amine that may be used are:—tertiary amyl amine borate, tertiary amyl amine carbonate, tertiary amyl amine stearate, the condensation product of tertiary amyl amine with benzaldehyde, etc.

It is understood that I regard myself as in no way limited by these examples and can use any other derivative of tertiary amyl amine that I choose.

The following examples are given:—

Example I.

90 parts smoked rubber sheets.
4 parts sulphur.
5 parts zinc oxide.
1 part tertiary amyl amine.

The temperature of the mixing is then raised to 140°–145° C. and vulcanization is complete in eight minutes.

Example II.

100 parts smoked sheets.
87 parts zinc oxide.
4 parts magnesium oxide.
8 parts sulphur.
1 part benzylidene tertiary amyl amine.

At a temperature of 140°–145° C. vulcanization is complete at the end of ten minutes.

The foregoing examples show how the accelerators may be used but I do not limit myself in any way to those examples.

What I claim is:

1. The herein described method of accelerating the vulcanization of rubber which consists in mixing with the rubber compound tertiary amyl amine.

2. The herein described method which consists in mixing with a rubber compound a small percentage of tertiary amyl amine, and thereafter raising the temperature of the compound.

3. The herein described method of accelerating the vulcanization of rubber which consists in mixing with the rubber compound a basic derivative of tertiary amylamine.

4. The herein described method of accelerating the vulcanization of rubber which consists in mixing with the rubber compound a derivative of tertiary amylamine.

5. As an article of manufacture a rubber compound containing tertiary amyl amine before vulcanization.

In testimony whereof, I affix my signature.

HAROLD A. MORTON.